(12) United States Patent
Reyes (10) Patent No.: US 10,035,547 B1
(45) Date of Patent: Jul. 31, 2018

(54) TRACTOR TRAILER SHOWER UNIT

(71) Applicant: Joel Reyes, Dayton, TX (US)

(72) Inventor: Joel Reyes, Dayton, TX (US)

( * ) Notice: Subject to any disclaimer, the term of this patent is extended or adjusted under 35 U.S.C. 154(b) by 0 days.

(21) Appl. No.: 15/383,651

(22) Filed: Dec. 19, 2016

Related U.S. Application Data (60) Provisional application No. 62/269,130, filed on Dec. 18, 2015.

(51) Int. Cl.

| | |
|---|---|
| *A47K 3/28* | (2006.01) |
| *B05B 9/00* | (2006.01) |
| *B62D 33/06* | (2006.01) |
| *A47K 3/022* | (2006.01) |
| *A47K 4/00* | (2006.01) |

(52) U.S. Cl.
CPC ............ *B62D 33/0612* (2013.01); *A47K 3/28* (2013.01); *B05B 9/002* (2013.01); *A47K 3/022* (2013.01); *A47K 4/00* (2013.01)

(58) Field of Classification Search
CPC . A47K 4/00; A47K 3/022; A47K 3/28; B05B 9/002; B62D 33/0612
See application file for complete search history.

(56) References Cited

U.S. PATENT DOCUMENTS

| | | | |
|---|---|---|---|
| 1,330,312 A | 2/1920 | Figueroa | |
| 1,846,631 A | 2/1932 | Cunningham | |
| 2,052,420 A | 8/1936 | Peterson | |
| 3,381,316 A | 5/1968 | Anderson | |
| 3,925,828 A | 12/1975 | Kim | |
| 4,201,415 A * | 5/1980 | Suchanek | B60K 11/00 180/68.1 |
| 4,364,133 A | 12/1982 | Gunter | |
| 4,413,363 A | 11/1983 | Troiano | |
| 4,828,709 A * | 5/1989 | Houser | A47K 3/28 134/10 |
| 6,978,496 B2 * | 12/2005 | Adrian | F24H 1/06 122/169 |
| 7,047,577 B1 * | 5/2006 | Cirilli | A47K 3/325 4/599 |
| 9,308,948 B1 * | 4/2016 | Habhab | B62D 33/0612 |
| 9,351,611 B1 * | 5/2016 | Adrian | F24D 19/00 |
| 2005/0086738 A1 | 4/2005 | Gragtmans | |
| 2006/0196955 A1 * | 9/2006 | Moxon | B60H 1/2206 237/34 |
| 2012/0278985 A1 * | 11/2012 | Cornille | A47K 4/00 4/321 |
| 2014/0026315 A1 * | 1/2014 | Simpson | E03F 5/0408 4/597 |

* cited by examiner

*Primary Examiner* — Frederick C Nicolas
(74) *Attorney, Agent, or Firm* — Cramer Patent & Design, PLLC; Aaron R. Cramer (57) ABSTRACT

The present invention describes a tractor trailer shower unit which provides a shower enclosure having shower head and floor drain features. The shower unit also provides water heating and pumping equipment as well as a waste water collection tank, making it particularly suited for use within a tractor trailer rig. The shower unit is powered by the electrical system of the tractor trailer rig.

20 Claims, 7 Drawing Sheets

Fig. 7

TRACTOR TRAILER SHOWER UNIT

RELATED APPLICATIONS

The present invention is a continuation of, was first described in, and claims the benefit of U.S. Provisional Application No. 62/269,130 filed Dec. 18, 2015, the entire disclosures of which are incorporated herein by reference.

FIELD OF THE INVENTION

The present invention relates to a shower unit particularly suited for use within a tractor trailer rig.

BACKGROUND OF THE INVENTION

There are countless tractor-trailer trucks that crisscross our country every day. These large vehicles bring just about every object we touch in our daily lives to use. While these tractor-trailer rigs provide their drivers with almost every available convenience including sleeping quarters, one item that is typically not present is the luxury of a hot shower. Truck drivers must rely on truck stops, hotels, or other locations with conventional showers to provide this necessity. However, as one can imagine, such facilities are not always available when needed. As such, drivers may have to go several days without a shower thus compromising their hygiene and perhaps even their health as well.

Accordingly, there exists a need for a means by which the refreshing feeling of a hot shower can be easily provided for drivers of tractor-trailer rigs without the difficulties as described above. The use of shower unit provides users the ability to quickly and easily take a shower almost anywhere in a manner which is not only quick and easy but discrete as well.

SUMMARY OF THE INVENTION

It is therefore an object of the present invention to provide a shower unit which comprises a shower enclosure, a water supply system, and a waste water collection tank. The shower enclosure has a control means in electrical communication with a power source, a side panel having a showerhead aperture subjacent a top edge, a water valve aperture vertically subjacent the showerhead aperture and a "U"-shaped locking feature at a bottom edge and a floor panel defining a bowl. The bowl has a drain aperture which is centrally disposed within the bowl and an "L"-shaped locking feature at a first top bowl edge. The side panel is capable of being secured to an interior first side of a vehicle interior opposite a front end of the vehicle while the floor panel is capable of being secured to an interior bottom side of the vehicle interior. The "L"-shaped locking feature interlocks with the "U"-shaped feature. In an alternate embodiment, the side panel and floor panel comprise a single piece of unitary construction.

The water supply system comprises a water supply reservoir defining an interior capable of retaining a volume of water, an intake tube which is in fluid communication with the water supply reservoir interior, a pump which is in fluid communication with the water supply reservoir interior and in fluid communication with a water valve which projects through the water valve aperture, a showerhead which projects through the showerhead aperture and is in fluid communication with the water valve and a heating element which is in thermoelectric communication with the water supply reservoir interior. The pump and the heating element are in electrical communication with the control means and the control means is capable of individually activating the pump and the heating element.

The waste water collection tank defines an interior which can retain a volume of water and is in fluid communication with the drain aperture. The drain aperture comprises a drain valve which is in fluid communication with the interior. The actuation of the drain valve in a first direction permits drainage of the waste water collection tank while the actuation of the drain valve in a second direction prohibits drainage of the waste water collection tank.

The control means may comprise of a control box which may have a first LED disposed upon a first face of the control box, a second LED disposed adjacent the first LED, a first switch disposed upon a first face of the control box and a second switch disposed upon a first face of the control box. The first switch is in electrical communication with the power source, the first LED and the pump while the second switch is in electrical communication with the power source, the second LED and the heating element. Activation of the first switch illuminates the first LED and activates the pump while deactivation of the first switch ceases the illumination of the first LED and deactivates the pump. Activation of the second switch illuminates the second LED and activates the heating element while deactivation of the second switch ceases the illumination of the second LED and deactivates the pump.

A water tight seal may be achieved with an application of a sealant within an interior seem of the "U"-shaped feature. The shower enclosure is approximately nine feet (9 ft.) in height, three feet (3 ft.) in depth, and three feet (3 ft.) in width. The water supply reservoir may have a fluid capacity of approximately twelve gallons (12 Gal).

The control box may be capable of being mounted within the vehicle. The water supply reservoir and the waste water collection tank may comprise either stainless steel or plastic. The fluid transfer material may comprise an insulated polyvinylchloride. The shower unit may also comprise a shower curtain rod having a shower curtain secured upon the rod by a plurality of shower curtain rings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 tractor trailer shower unit
20 shower enclosure
21 showerhead aperture
22 side panel
23 floor drain aperture
24 floor panel
26 rod/curtain assembly
27 "L"-shaped feature
28 "U"-shaped feature
29 caulk
30 floor drain
31 floor drain aperture
32 shower head
34 water valve/knob
40 supply water tank
42 inlet connection
43 fill cap
44 pump
45 heating element
46 outlet connection
50 first conduit
51 second conduit
52 third conduit
60 waste water tank
62 drain valve
70 fastener
72 bracket
80 wiring
82 control box
84 heater switch
86 pump switch
88 power adapter
90a first indicator lamp
90b second indicator lamp
100 water
110 tractor trailer rig
120 cab
125 cab frame member
130 truck frame member

DETAILED DESCRIPTION OF THE PREFERRED EMBODIMENT

The best mode for carrying out the invention is presented in terms of its preferred embodiment, herein depicted within FIG. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a tractor trailer shower unit (herein described as the "apparatus") 10, which provides a shower enclosure 20 being particularly suited for use within a cab portion 120 of a tractor trailer rig 110. The apparatus 10 provides a self-contained showering means complete with a water supply tank 40, a water heating element 45, and a waste water collection tank 60. The apparatus 10 preferably receives electrical power from an existing electrical system of the tractor trailer rig 110. Installation within a cab area 120 of a tractor trailer rig 110 is a preferred installation of the apparatus 10; however, it is understood that the apparatus 10 may also be utilized in other locations such as within recreational vehicles, outdoor camping locations, at work sites, and other temporary locations, and as such should not be interpreted as a limiting factor of the invention.

Figure 1:
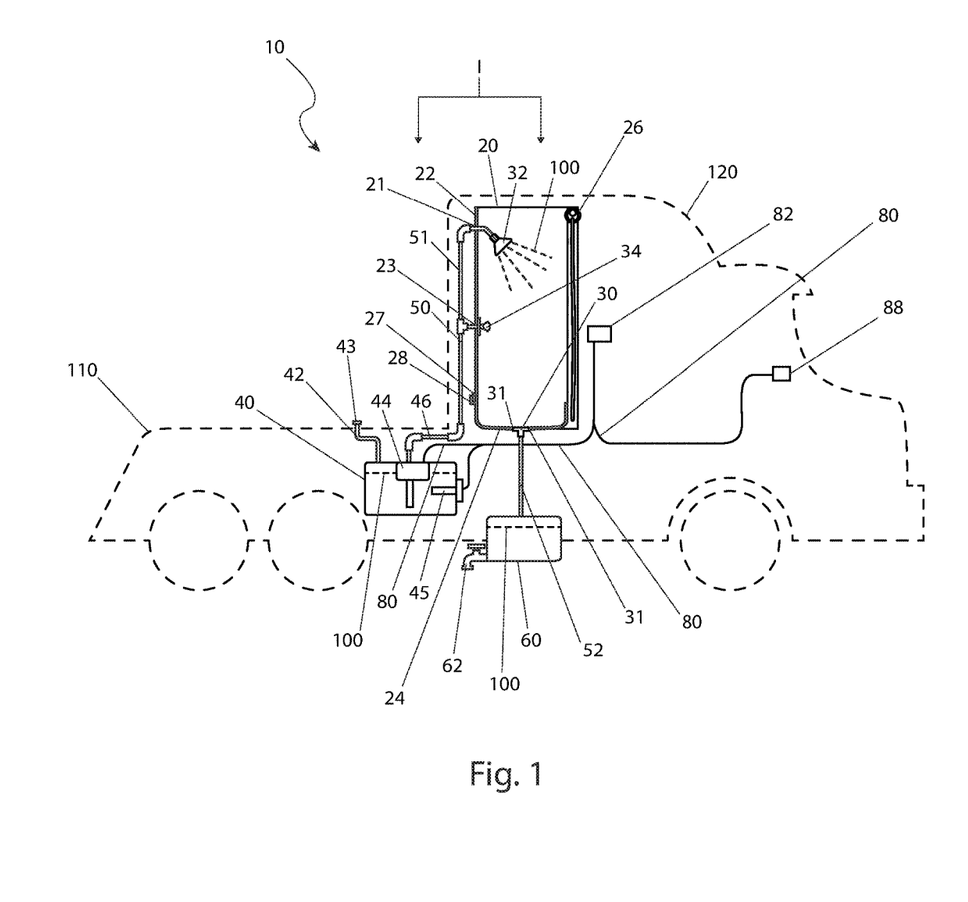
FIG. 1 is an environmental view of a tractor trailer shower unit 10 illustrated within the context of an existing tractor trailer rig 110, according to a preferred embodiment of the present invention.

Referring now to FIG. 1, an environmental view of the apparatus 10 illustrated within the context of an existing tractor trailer rig 110, according to the preferred embodiment of the present invention, is disclosed. The apparatus 10 is illustrated here including all materials and components necessary for installation within an existing tractor trailer rig 110, including various convenient shower stall features including a shower rod/curtain assembly 26, and indicator lamps 90a, 90b which correspond to a water pump 44 and water heater 45. The apparatus 10 is illustrated herein depicting retrofit installation within a cab portion 120 of existing tractor trailer rigs 110; however, it is understood that the apparatus 10 may also be incorporated within designs of new tractor trailer rigs 110 without deviating from the teachings of the apparatus 10, and as such should not be interpreted as a limiting factor of the apparatus 10.

Figure 6:
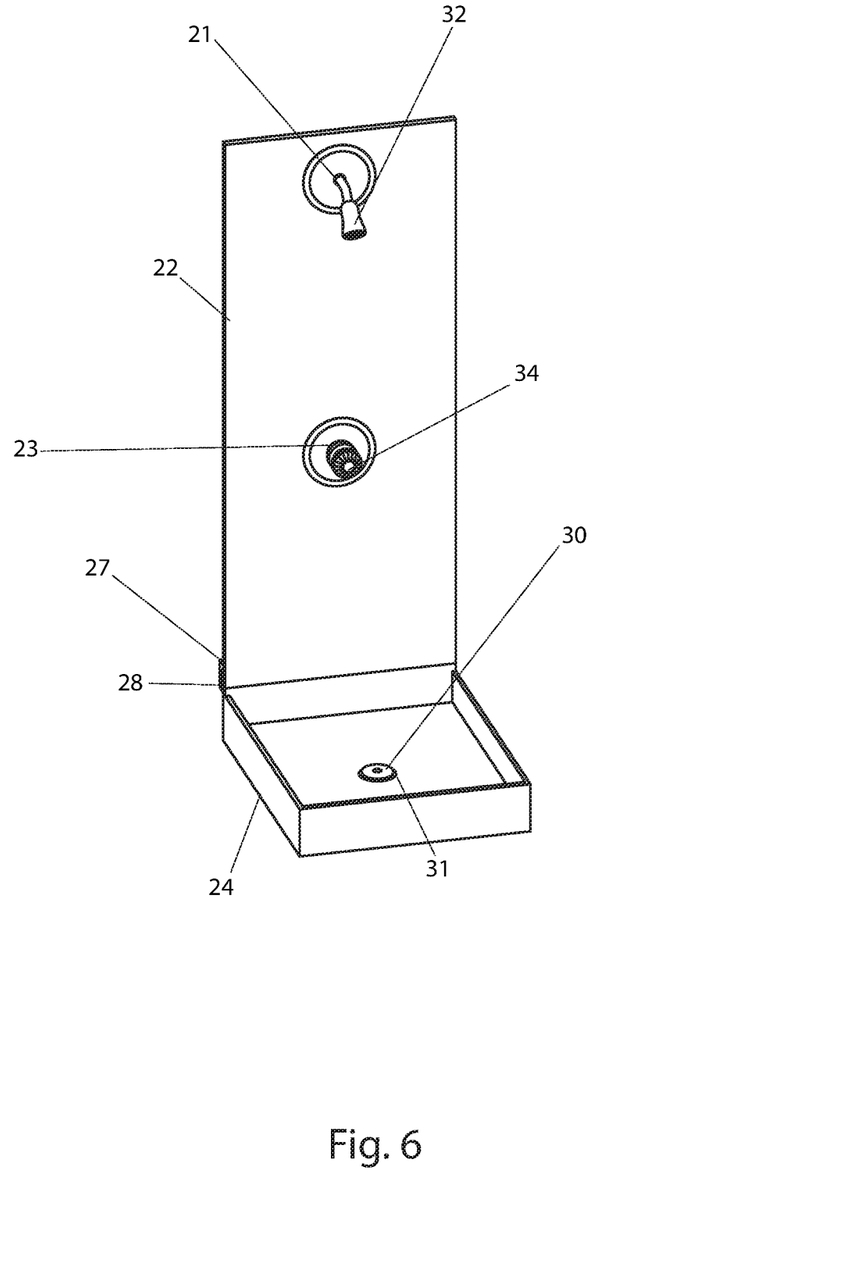
FIG. 6 is a perspective view of the tractor trailer shower unit 10, highlighting the side panel 22 and floor panel 24 according to a preferred embodiment of the present invention; and, FIG. 7 is a perspective view of the tractor trailer shower unit 10, highlighting a unitary construction of an alternate embodiment of the present invention.
Figure 7:
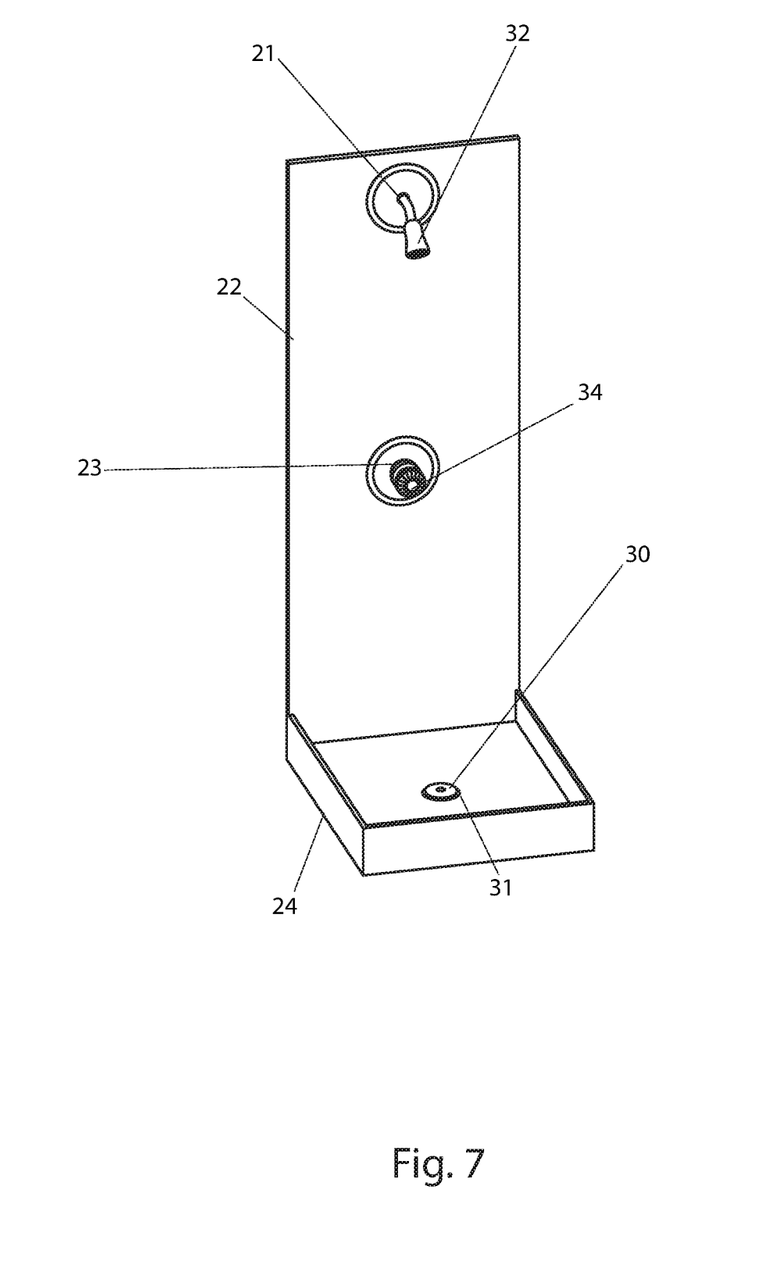

The shower enclosure 20 is envisioned to have approximate internal dimensions of nine (9 ft.) feet in height, three (3 ft.) feet in depth, and three (3 ft.) feet in width (also see FIG. 6). The shower enclosure 20 further provides integrated portions including a shower rod/curtain assembly 26, a shower head 32, a floor drain 30, and a water valve/knob 34. The shower enclosure 20 is envisioned to provide a three-sided structure and is envisioned to be made up of a plurality of molded fiberglass side panel 22 having a shower head aperture 21 through which the shower head 32 is secured and a water valve aperture 23 below said shower head aperture 21 through which the water valve/knob 34 is secured, floor panel 24 having a floor drain aperture 31 through which a floor drain 30 is secured to provide a secure and rigid structure (also see FIG. 2). However, the shower enclosure 20 may also be a unitary molded fiberglass structure when utilized within new tractor trailer construction, and as such should not be interpreted as a limiting factor of the apparatus 10 (please see FIG. 7).

The embodiment of the apparatus 10 illustrated here provides a supply of heated water 100 to the shower head portion 32 of the shower enclosure 20 via a supply water tank 40 and a first conduit 50 and second conduit 51. The supply water tank 40 includes an internal water pump 44 and a water heating element 45. The waste water tank 60 collects and stores the waste water 100 as it exits the shower enclosure 20 through the floor drain 30 and a third conduit 52 portion. The pump 44 is in fluid communication with an outlet connection portion 46 of the supply water tank 40 which in turn is in fluid communication with the first conduit

50. The first conduit 50 includes inline portions including the water valve/knob 34 while the second conduit 51 includes inline portions such as the shower head 32. The first conduit 50 and second conduit 51 are envisioned to be routed discreetly within the cab 120 and along a rear surface of the shower enclosure 20. The first conduit 50 and second conduit 51 is envisioned to be made up of plumbing and fittings, preferably being thermally insulated and made of a polyvinylchloride (PVC) material or equivalent pressure-rated material. The shower head 32 and water valve/knob 34 portions are integrated into the respective first conduit 50 and second conduit 51 in an in-line manner and are to protrude through side panel 22 portions of the shower enclosure 20 so as to be accessible to a user from within the shower enclosure 20 (see FIGS. 3 and 5).

The apparatus 10 also provides a control box 82 which is to be operably located within the cab 120, such as upon an interior wall, upon a dashboard, a console, or the like, to enable convenient operation of the apparatus 10. The control box 82 provides a means to activate and monitor the pump 44 and the heating element 45 portions. The control box 82 is envisioned to receive electrical power from the existing electrical system of the tractor trailer rig 110 via wiring 80 and a removably attachable power converter 88 which utilizes a dashboard-mounted cigarette lighter socket (also see FIG. 5).

Figure 2:
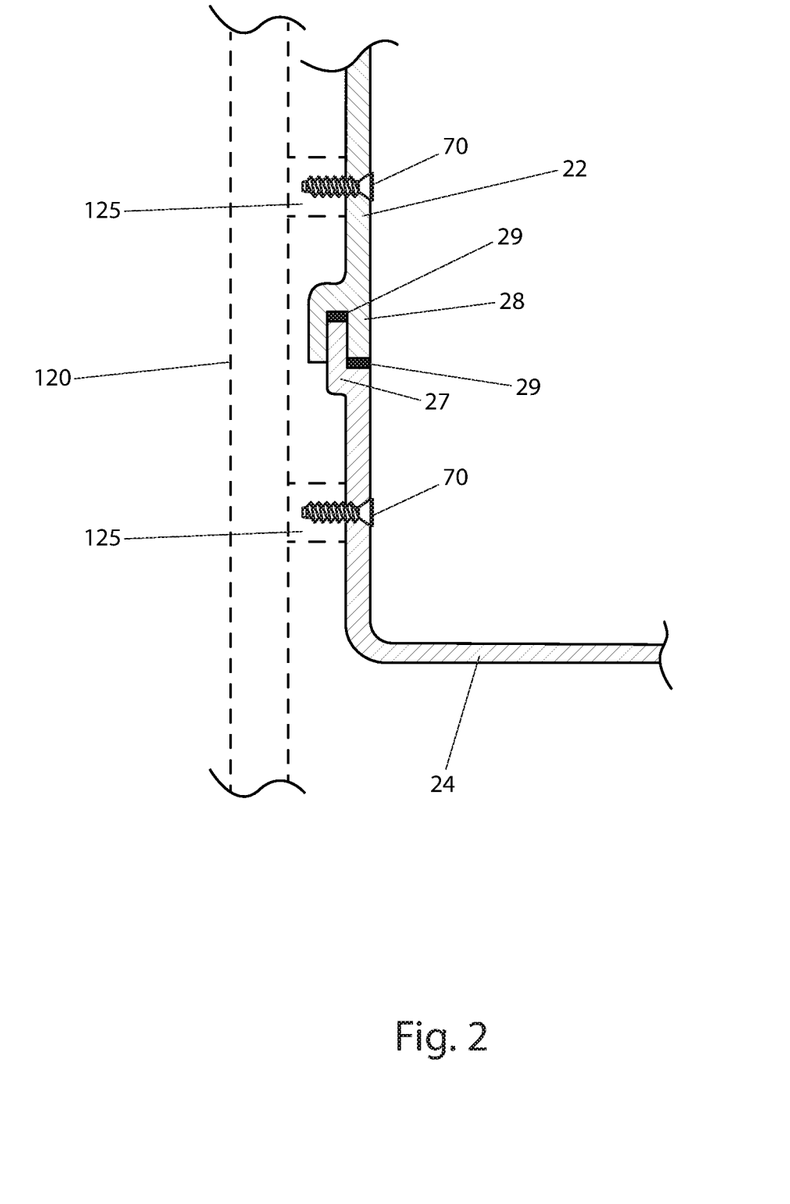
FIG. 2 is a top sectional view of the shower unit 10 depicting attachment of a shower enclosure portions 20 and cab portions 120 of the existing tractor trailer rig 110, according to a preferred embodiment of the present invention.

Referring now to FIG. 2, a top sectional view of the apparatus 10 depicting attachment of a shower enclosure portions 20 to cab portions 120 of the existing tractor trailer rig 110, according to a preferred embodiment of the present invention, is disclosed. The shower enclosure 20 is envisioned to provide a three-sided structure having a plurality of side panels 22, and a floor panel 24 which includes an integrally-molded, or otherwise incorporated floor drain 30 portion. The shower enclosure 20 is preferably made up of three (3) or four (4) individually molded fiberglass side 22 and floor 24 panels. The side 22 and floor 24 panels interlock with each other and are sealed to form a rectangular structure with one (1) open side portion to facilitate a rod/curtain assembly 26.

Attachment of the shower enclosure 20 to the cab portions 120 of the existing tractor trailer rig 110 is envisioned to utilize the same attachment features used for sleeper cab equipment, interior wall coverings, and the like. The shower enclosure 20 would be provided with various mounting brackets 72 and fasteners 70 required for secure attachment of the apparatus 10 to existing portions of the cab 120 such as frame members 125, a ceiling, or walls. Various attachment methods and materials may be used such as, but not limited to: fasteners 70, liquids nails, clips, small screws, or the like, to complete a customized installation within popular makes and models of tractor trailer cabs 120. In the embodiment of the apparatus 10 shown here, the shower enclosure 20 is mounted and secured to interior cab frame members 125 of the cab 120 using fasteners 70 such as screws or bolts.

The individual sections of the shower enclosure 120 are to utilize integrally-molded features which provide structurally sound and leak-proof joints. In the embodiment of the shower enclosure 120 shown here, edge portions of adjacent side panels 22 are joined via respective linear interlocking features including an "L"-shaped feature 27 and a "U"-shaped feature 29. The features 27, 29 include an interlocking design which results in esthetic flat interior surface. Furthermore, the features 27, 29 may be assembled together and sealed using at least one (1) bead of silicone caulk 29, or an equivalent compound, in between to prevent leakage.

Figure 3:
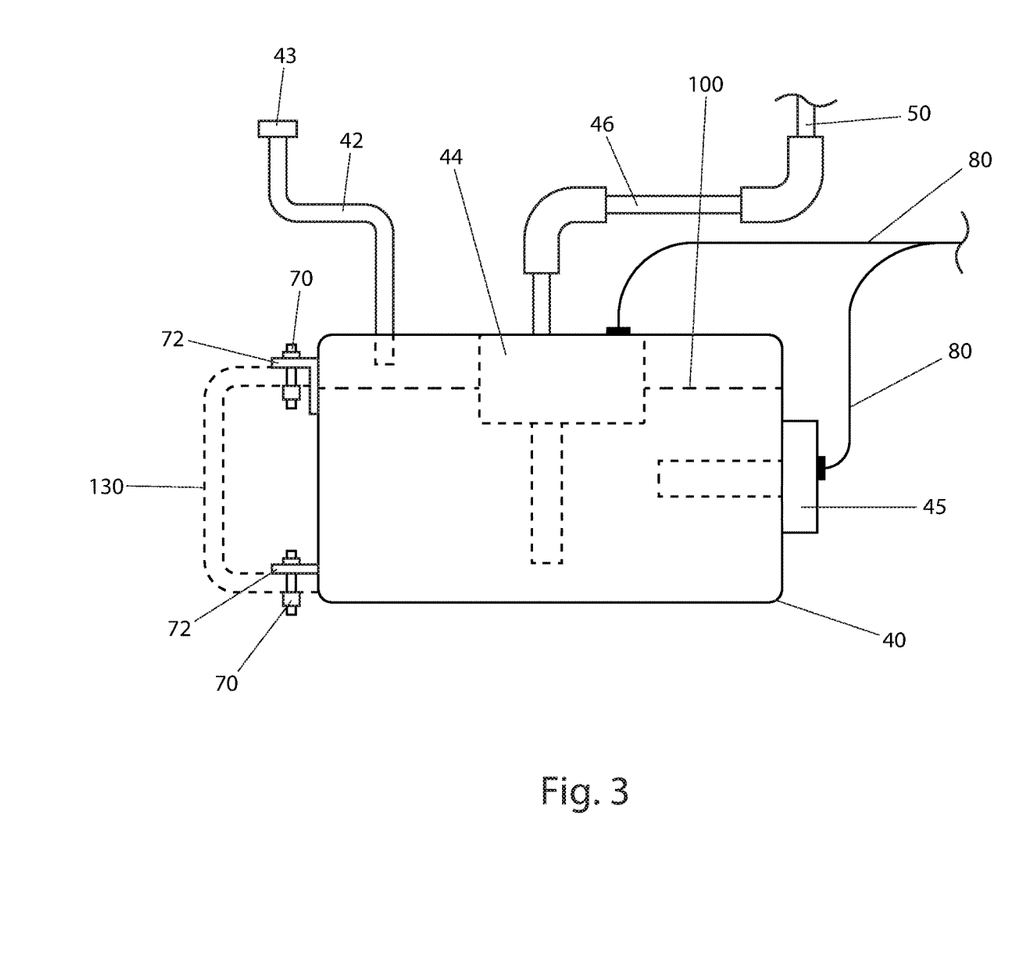
FIG. 3 is a side view of a supply water tank portion 40 of the shower unit 10 depicting attachment to truck frame member portions 130 of the existing tractor trailer rig 110, according to a preferred embodiment of the present invention.
Figure 4:
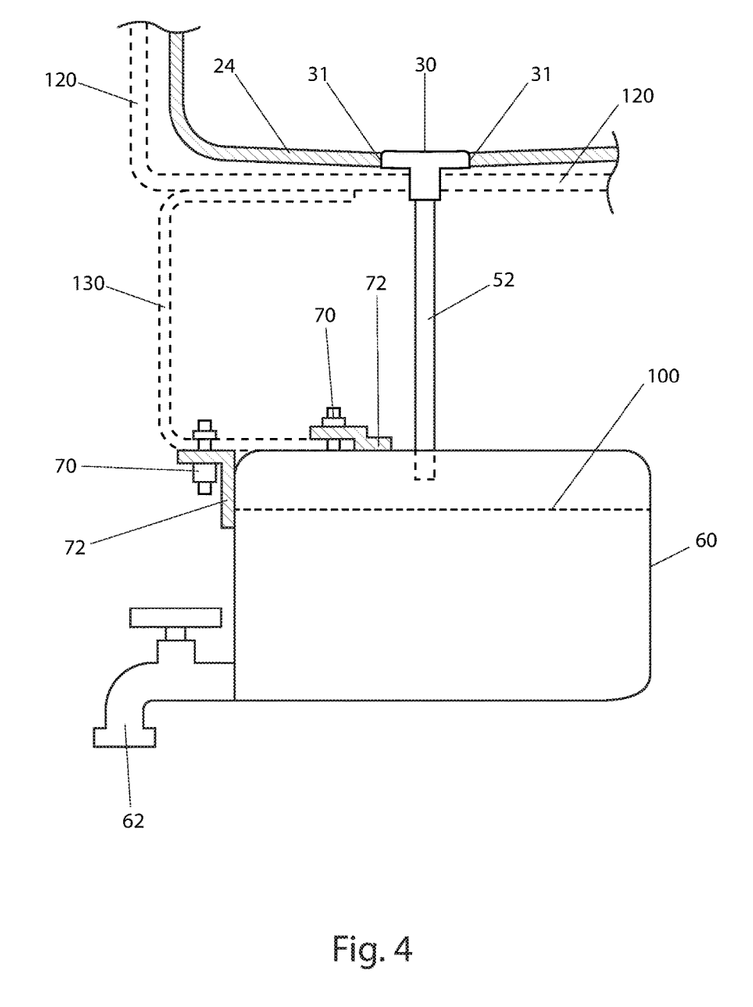
FIG. 4 is a side view of the shower enclosure 20 and waste water tank 60 portions of the shower unit 10, according to a preferred embodiment of the present invention.

Referring now to FIGS. 3 and 4, side views of supply water tank 40 and waste water tank 60 portions of the apparatus 10, according to a preferred embodiment of the present invention, are disclosed. The supply water tank 40 is to be mounted to a truck frame member 130 of the tractor trailer rig 110, and positioned below a floor level of the cab 120 using various brackets 72 and fasteners 70. In an embodiment of the supply water tank 40 shown here, the supply water tank 40 includes a plurality of molded-in, or otherwise integrated brackets 72 being made using angle-shapes and being positioned so as to engage and be fastened to the truck frame member 130 using fasteners 70 such as bolts.

The supply water tank 40 is to have a fluid capacity of approximately twelve gallons (12 Gal). The supply water tank 40 is envisioned to be made using a suitable plastic or stainless steel material and having a fluid inlet connection 42 and a fluid outlet connection 46. The inlet connection 42 forms a conduit means being in fluid communication with the supply water tank 40 and extends outwardly from the supply water tank 40 to an easily accessed portion of the tractor trailer rig 110 such as along a lower side portion. The fluid inlet connection 42 provides a threaded fill cap 43 and is to be easily accessible for periodic filling of the supply water tank 40 by an operator.

The supply water tank 40 includes an internal pump 44 which is mounted within the supply water tank 40 and is powered by an integral electric motor. The pump 44 is envisioned to be a submersible-type unit, providing continuous flow of pressurized water 100 to the water valve/knob portion 34 of the shower enclosure 20 when activated. The pump 44 is in fluid communication with the outlet connection 46 which in turn is in fluid communication with a first conduit 50 and second conduit 51 (also see FIG. 1).

The waste water tank 60 collects and stores the waste water 100 as it exits the shower enclosure 20 through the floor drain 30 and subsequently passes through the third conduit 52. The waste water tank 60 is envisioned to incorporate similar materials and construction as the supply water tank 40. The waste water tank 60 is to be mounted to an existing truck frame member 130 and positioned below the floor level of the tractor trailer rig 110 using various brackets 72 and fasteners 70. The waste water tank 60 is in fluid communication with the floor drain portion 30 of the shower enclosure 20 via the third conduit 52. The third conduit 52 is envisioned to be made using similar insulated plumbing materials as the previously described first conduit 50 and second conduit 51. The waste water tank 60 is to have a fluid capacity of approximately twelve gallons (12 Gal). The waste water tank 60 further provides a conveniently located and easily accessed drain valve portion 62 for disposal of the waste water 100 when appropriate facilities are available.

Figure 5:
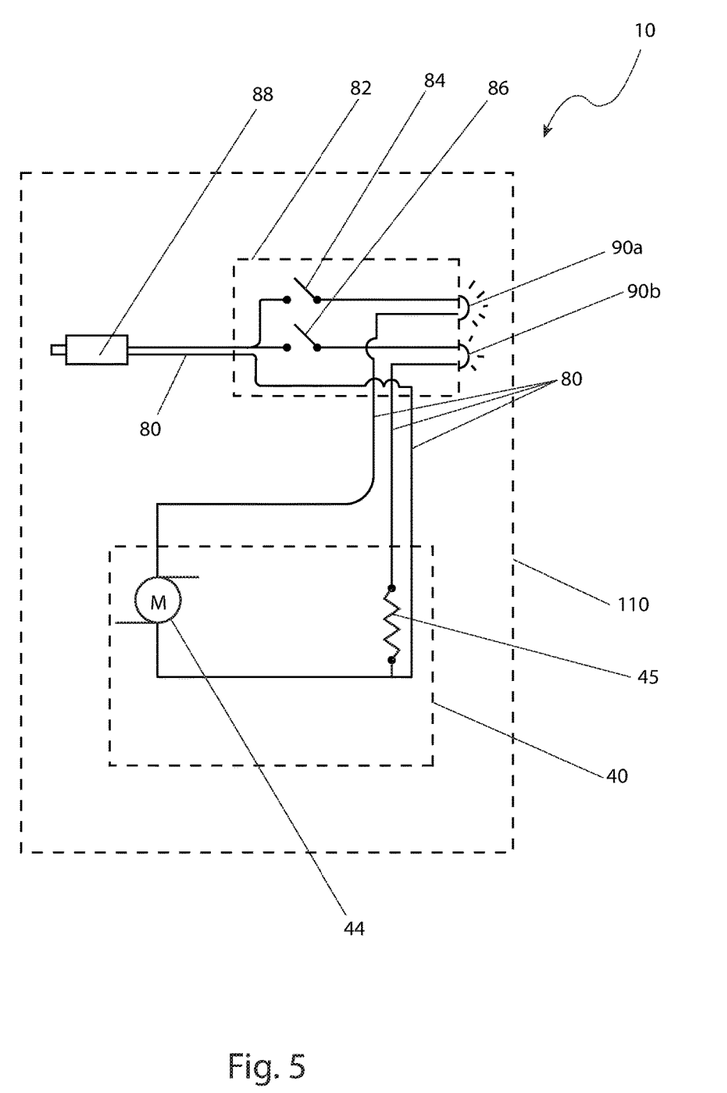
FIG. 5 is an electrical diagram of the tractor trailer shower unit 10, according to a preferred embodiment of the present invention.

Referring now to FIG. 5, an electrical diagram of the apparatus 10, according to the preferred embodiment of the present invention, is disclosed. The apparatus 10 provides a means for an operator to activate and control the pump 44 and the heating element 45 portions while within the cab 120 via the control box 82.

The control box 82 is to be located conveniently within the cab 120 of the tractor trailer rig 110 being either mounted to, or integrated into, the cab portion 120 of the tractor trailer rig 110. The control box 82 preferably receives electrical power from the existing electrical system of the tractor trailer rig 110. The control box 82 receives and distributes electrical power to the components of the apparatus 10 via common wiring 80. An electrical diagram of the control box 82 is shown here including a heater switch 84 and a pump switch 86, both envisioned to be simple two-position contact-closure-type devices. The control box 82 further includes a first indicator lamp 90a and a second indicator lamp 90b which illuminate upon activation of the heater switch 84 or pump switch 86 portions. The heater switch 84 or pump switch 86 are in electrical communication with respective heating element 45 and pump 44 portions. The control box 82 is seen here being in electrical communication with the existing electrical system of the tractor trailer rig 110 via a removably attachable power converter 88 envisioned to be similar to those which are inserted into a cigarette lighter socket; however, a permanently wired connection between the apparatus 10 and the existing electrical system may also be utilized with equal benefit. The control box 82 is to be operably located within the cab 120, such as upon an interior wall surface, upon a dashboard, a console, or the like, to enable convenient operation.

It is understood that the control box 82 may include additional convenience features based upon a user's preferences such as, but not limited to: timers, temperature feedback sensing, a digital display, and the like, and as such should not be interpreted as a limiting factor of the apparatus 10.

The pump 44 is envisioned to be an electric submersible-type unit envisioned to maintain a consistent water pressure to the water valve/knob 34 via a flow bypass circuit, pressure regulating valve, or the like. The heating element 45 is envisioned to be a resistor-type unit which provides sufficient heat output to acquire a temperature of the water 100 suitable for showering. As a safety feature, the heating element 45 preferably provides a fixed BTU output so as to maintain a constant suitable temperature of the water 100 within the supply water tank 40. It is understood that the heating element 45 may utilize other technologies such as an in-line-type water heater element, a heat exchanger, or the like, without deviating from the teachings of the apparatus 10, and as such should not be interpreted as a limiting factor.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of performing a retrofit installation of the apparatus 10 within an existing tractor trailer cab 120 may be achieved by performing the following steps: procuring a model of the apparatus 10 which includes appropriate brackets 72 and fasteners 70 which corresponds to a particular make and model of a tractor trailer rig 110; mounting the supply water tank 40 and waste water tanks 60 to truck frame members 130 of the tractor trailer rig 110 using the supplied brackets 72 and fasteners 70; removing all sleeper cab equipment, interior wall coverings, and the like, which interfere with the installation of the shower enclosure 20 within the cab 120; installing the first conduit 50 and second conduit 51 between the supply water tank 40 and the shower enclosure 20 by routing and mounting the plumbing and fitting portions of the first conduit 50 and second conduit 51 within the cab 120 and along a rear surfaces of the shower enclosure 20; assembling the side panel 22 and floor panel 24 portions of the shower enclosure 20 together using the interlocking "L"-shaped features 27 and "U"-shaped features 28; applying a sealing silicon caulk 29 or equivalent sealing compound to the joints between the features 27, 28 of the shower enclosure 20 portions 22, 24 to prevent leakage; mounting the side panel 22 and floor panel 24 portions of the shower enclosure 20 within the cab portion 120 of the tractor trailer rig 110 using supplied fasteners 70, while utilizing the existing cab frame members 125 of the cab 120 normally used to mount the original sleeper equipment, interior wall coverings, and the like; using the supplied brackets 72, fasteners 70, and any other materials needed to securely mount the shower enclosure 20 to the cab 120; installing the third conduit 52 between the waste water tank 60 and the floor drain portion 30 of the floor panel portion 24 of the shower enclosure 20; mounting the control box 82 within the cab 120 at a location convenient to the operator; routing and connecting all wiring 80 between the electrical components of the apparatus 10; and, routing and inserting the power adapter 88 into an existing dashboard-mounted cigarette lighter socket of the tractor trailer cab 120. The apparatus 10 is now ready for use.

The method of utilizing the apparatus 10 may be achieved by performing the following steps: filling the supply water tank 40 with a quantity of fresh water 100 from a clean water source using the fill cap portion 43 of the inlet connection 42; operating the tractor trailer rig 110 in a normal manner until desiring a shower; parking the tractor trailer rig 110 at an available suitable location; activating the heating element 45 by motioning the heater switch 84 located upon the control box 82; observing the illumination of the second indicator lamp 90b; allowing a period of time for the water 100 to acquire a desired showering temperature; activating the pump 44 when ready to shower, using the pump switch 86 located upon the control box 82; observing the illumination of the first indicator lamp 90a; entering the shower enclosure 20; drawing the rod/curtain assembly 26 across the open side portion of the shower enclosure 20; showering one's self using the water valve/knob 34 to control a flow of the heated water 100 from the shower head 32; allowing the waste water 100 from the shower enclosure 20 to flow through the floor drain 30 and third conduit 52 portions and be collected within the waste water tank 60; completing a shower in a normal manner; closing the water valve/knob 34 when finished showering; switching the heater 84 and pump 86 switches to their "off" position; disposing of the waste water 100 collected within the waste water tank 60, using the drain valve 62, when appropriate disposal facilities are available; and, benefiting from an effective showering means at a location and time of one's choosing, afforded a user of the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A shower unit, comprising:
  a shower enclosure comprising:
    a control means in electrical communication with a power source;
    a side panel having a showerhead aperture subjacent a top edge thereof, a water valve aperture vertically subjacent said showerhead aperture and a U-shaped locking feature at a bottom edge thereof; and,
a floor panel defining a bowl having a drain aperture centrally disposed therewithin and an L-shaped locking feature at a first top edge thereof;
wherein said side panel is capable of being secured to an interior first side of a vehicle opposite a front end of said vehicle;
wherein said floor panel is capable of being secured to an interior bottom side of said vehicle; and,
wherein said L-shaped locking feature interlocks with said U-shaped feature;
a water supply system, comprising:
a water supply reservoir defining an interior capable of retaining a volume of water therein;
an intake tube in fluid communication with said water supply reservoir interior;
a pump in fluid communication with said water supply reservoir interior and in fluid communication with a water valve projecting through said water valve aperture;
a showerhead projecting through said showerhead aperture and in fluid communication with said water valve; and,
a heating element in thermoelectric communication with said water supply reservoir interior;
wherein said pump and said heating element are in electrical communication with said control means; and,
wherein said control means is capable of individually activating said pump and said heating element;
a waste water collection tank defining an interior capable of retaining a volume of water therein and in fluid communication with said drain aperture comprising a drain valve in fluid communication with said interior thereof;
wherein actuation of said drain valve in a first direction permits drainage of said waste water collection tank; and,
wherein actuation of said drain valve in a second direction prohibits drainage of said waste water collection tank.

2. The shower unit of claim 1, wherein said control means further comprises:
a control box:
a first LED disposed upon a first face of said control box;
a second LED disposed adjacent said first LED;
a first switch disposed upon a first face of said control box; and,
a second switch disposed upon a first face of said control box;
wherein said first switch is in electrical communication with said power source, said first LED and said pump;
wherein said second switch is in electrical communication with said power source, said second LED and said heating element;
wherein activation of said first switch illuminates said first LED and activates said pump;
wherein deactivation of said first switch ceases said illumination of said first LED and deactivates said pump;
wherein activation of said second switch illuminates said second LED and activates said heating element; and,
wherein deactivation of said second switch ceases said illumination of said second LED and deactivates said pump.

3. The shower unit of claim 1, wherein a water tight seal is achieved with an application of a sealant within an interior seem of said U-shaped feature.

4. The shower unit of claim 1, wherein said shower enclosure is approximately nine feet in height, three feet in depth, and three feet in width.

5. The shower unit of claim 1, wherein said water supply reservoir has a fluid capacity of approximately twelve gallons.

6. The shower unit of claim 1, wherein said control means is a control box capable of being mounted within said vehicle.

7. The shower unit of claim 1, wherein said water supply reservoir and said waste water collection tank comprise stainless steel.

8. The shower unit of claim 1, wherein said water supply reservoir and said waste water collection tank comprise plastic.

9. The shower unit of claim 1, further comprising thermally insulated polyvinylchloride fluid transfer material.

10. The shower unit of claim 1, wherein said shower unit further comprises a shower curtain rod having a shower curtain secured upon said rod by a plurality of shower curtain rings.

11. A shower unit, comprising:
a shower enclosure comprising:
a control means in electrical communication with a power source;
a side panel having a showerhead aperture subjacent a top edge thereof, a water valve aperture vertically subjacent said showerhead aperture; and,
a floor panel defining a bowl having a drain aperture centrally disposed therewithin;
wherein said side panel is capable of being secured to an interior first side of a vehicle opposite a front end of said vehicle; and,
wherein said floor panel is capable of being secured to an interior bottom side of said vehicle;
a water supply system, comprising:
a water supply reservoir defining an interior capable of retaining a volume of water therein;
an intake tube in fluid communication with said water supply reservoir interior;
a pump in fluid communication with said water supply reservoir interior and in fluid communication with a water valve projecting through said water valve aperture;
a showerhead projecting through said showerhead aperture and in fluid communication with said water valve; and,
a heating element in thermoelectric communication with said water supply reservoir interior;
wherein said pump and said heating element are in electrical communication with said control means; and,
wherein said control means is capable of individually activating said pump and said heating element;
a waste water collection tank defining an interior capable of retaining a volume of water therein and in fluid communication with said drain aperture comprising a drain valve in fluid communication with said interior thereof;
wherein actuation of said drain valve in a first direction permits drainage of said waste water collection tank; and, wherein actuation of said drain valve in a second direction prohibits drainage of said waste water collection tank.

12. The shower unit of claim 11, wherein said control means further comprises:
a control box:
a first LED disposed upon a first face of said control box;
a second LED disposed adjacent said first LED;
a first switch disposed upon a first face of said control box; and,
a second switch disposed upon a first face of said control box;
wherein said first switch is in electrical communication with said power source, said first LED and said pump;
wherein said second switch is in electrical communication with said power source, said second LED and said heating element;
wherein activation of said first switch illuminates said first LED and activates said pump;
wherein deactivation of said first switch ceases said illumination of said first LED and deactivates said pump;
wherein activation of said second switch illuminates said second LED and activates said heating element; and,
wherein deactivation of said second switch ceases said illumination of said second LED and deactivates said pump.

13. The shower unit of claim 11, wherein said side panel and said floor panel are of unitary construction.

14. The shower unit of claim 11, wherein said shower enclosure is approximately nine feet in height, three feet in depth, and three feet in width.

15. The shower unit of claim 11, wherein said water supply reservoir has a fluid capacity of approximately twelve gallons.

16. The shower unit of claim 11, wherein said control means is a control box capable of being mounted within said vehicle.

17. The shower unit of claim 11, wherein said water supply reservoir and said waste water collection tank comprise stainless steel.

18. The shower unit of claim 11, wherein said water supply reservoir and said waste water collection tank comprise plastic.

19. The shower unit of claim 11, further comprising thermally insulated polyvinylchloride fluid transfer material.

20. The shower unit of claim 11, wherein said shower unit further comprises a shower curtain rod having a shower curtain secured upon said rod by a plurality of shower curtain rings.

* * * * *